(12) United States Patent
Groshong

(10) Patent No.: US 6,218,972 B1
(45) Date of Patent: Apr. 17, 2001

(54) TUNABLE BANDPASS SIGMA-DELTA DIGITAL RECEIVER

(75) Inventor: Richard Groshong, Linn County, IA (US)

(73) Assignee: Rockwell Science Center, Inc., Thousand Oaks, CA (US)

( * ) Notice: Subject to any disclaimer, the term of this patent is extended or adjusted under 35 U.S.C. 154(b) by 0 days.

(21) Appl. No.: 08/927,766

(22) Filed: Sep. 11, 1997

(51) Int. Cl.[7] ....................................... H03M 3/00
(52) U.S. Cl. .................. 341/143; 341/144; 375/247; 375/324; 375/340
(58) Field of Search ..................... 375/247, 314, 375/324, 328, 340; 341/77, 143; 348/371, 372

(56) References Cited

U.S. PATENT DOCUMENTS

| | | | |
|---|---|---|---|
| 5,051,799 | * | 9/1991 | Paul et al. .................. 375/25 |
| 5,311,181 | * | 5/1994 | Ferguson, Jr. et al. ........ 341/143 |
| 5,319,370 | * | 6/1994 | Sigmore et al. ............. 341/120 |
| 5,329,553 | * | 7/1994 | Abbiate et al. .............. 375/28 |
| 5,387,913 | * | 2/1995 | Park et al. .................. 341/175 |
| 5,389,927 | * | 2/1995 | Turney et al. ............... 341/139 |
| 5,559,514 | * | 9/1996 | Thomson .................... 341/143 |
| 5,706,308 | * | 1/1998 | Ichimura ..................... 375/247 |
| 5,768,315 | * | 6/1998 | Mittel et al. ................. 375/247 |
| 5,790,061 | * | 8/1998 | Norimatsu ................... 341/139 |
| 5,793,811 | * | 8/1998 | Yu ............................ 375/247 |
| 5,821,890 | * | 10/1998 | Kim et al. ................... 341/143 |
| 5,952,947 | * | 9/1999 | Nussbaum et al. ............ 341/143 |

* cited by examiner

Primary Examiner—Stephen Chin
Assistant Examiner—Dac V. Ha
(74) Attorney, Agent, or Firm—Nathan O. Jensen; Kyle Eppele; James P. O'Shaughnessy

(57) ABSTRACT

A tunable bandpass sigma-delta modulator analog-to-digital converter (A/D converter or ADC) utilized in conjunction with a digital signal processor (DSP) to eliminate the analog frequency synthesizer in a radio design is disclosed. The sigma-delta ADC greatly reduces the analog circuitry requirements and ensures that the circuitry is suitable for very large scale integration (VLSI). The all-digital DSP ensures the highest level of VLSI and provides for high performance frequency synthesis and translation completely in the digital domain.

3 Claims, 3 Drawing Sheets

TUNABLE BANDPASS SIGMA-DELTA DIGITAL RECEIVER

BACKGROUND OF THE INVENTION

The present invention generally relates to the field of digital radio-frequency or intermediate-frequency receivers, and more particularly to a tunable sigma-delta modulator for utilization in a digital receiver.

Very large scale integration (VLSI) technology is typically utilized to achieve significant reductions in the size, power dissipation and cost of electronic circuits. However, current digital radio receiver architectures prevent the efficient application of very large scale integration because the large amount of analog signal processing needed in the frequency synthesizers and the analog frequency translators is simply not amenable to VLSI applications. For example, high performance analog frequency synthesizers require large, shielded voltage controlled oscillators (VCOs), intermediate frequency (IF) filters typically utilize discrete crystal, ceramic, surface acoustic wave (SAW) or mechanical components, balanced mixers often require transformer coupling, and automatic gain control (AGC) attenuators often utilize p-i-n diodes in their design.

One way in which very large scale implementation of a digital radio may be implemented is by replacing the functions of the analog frequency synthesizers and analog frequency translators with high speed, wide bandwidth active filters which are amenable to VLSI and utilizing a tunable bandpass sigma-delta modulator in combination with digital signal processing techniques.

Sigma-delta ADCs use oversampling, noise shaping, digital filtering, and sample-rate decimation to obtain high dynamic range and high resolution. Because they use oversampling, the anti-alias filtering requirements of the ADC are reduced to allow simple, low-order designs. Theoretically, low-pass sigma-delta techniques can be extended to bandpass signal sampling (or RF/IF sampling) as typically required in a DSP-based digital radio implementation. Neglecting parasitic effects, a low-pass modulator can simply be frequency scaled to a bandpass frequency as with any filter design. However, the order of the modulator filter would have to approximately double to obtain the same noise shaping performance as the low-pass modulator. This makes the modulator much more difficult to design and to keep stable.

Fixed-tuned bandpass sigma-delta conversion has the potential for eliminating or simplifying the IF anti-alias filter requirements in a multistage RF-to-IF translator design for a digital receiver implementation. In fact, fixed-tuned bandpass modulators have been discussed in the engineering literature. Many fixed-tuned low-pass sigma-delta ADCs are commercially available today in integrated circuit form. In fact, this type of ADC is dominant in high performance consumer audio frequency applications.

However, a fixed-tuned design does not eliminate the frequency synthesizer and translator requirements in a radio design as would be required for a very large scale integration implementation. Further, due to the instability of high-order bandpass filter as required in an RF/IF design, a fixed-tuned sigma-delta converter would be too difficult and costly to implement. Thus, there lies a need for a tunable bandpass sigma-delta digital receiver.

SUMMARY OF THE INVENTION

The present invention utilizes a tunable bandpass sigma-delta modulator analog-to-digital converter (A/D converter or ADC) in conjunction with a digital signal processor (DSP) to eliminate the analog frequency synthesizer and analog frequency translator in a digital radio design. The sigma-delta ADC greatly reduces the analog circuitry requirements and ensures that the radio circuitry is suitable for very large scale integration (VLSI). The all-digital DSP ensures the highest level of VLSI and provides for high performance frequency synthesis and translation completely in the digital domain.

It is therefore an object of the present invention to utilize a tunable sigma-delta modulator in radio-frequency and intermediate-frequency radio receivers and transmitters such that the radio designs are amenable to very large scale integration.

It is another object of the present invention to utilize an algorithm or equivalent means for dynamically tuning and adjusting the transfer function of a sigma-delta modulator in order to optimize the performance of the modulator at multiple tunable frequencies.

It is a further object of the present invention to utilize an algorithm or equivalent means for dynamically tuning and adjusting the transfer function of a sigma-delta modulator in order to compensate for component tolerances and parasitic effects of the modulator at multiple tunable frequencies.

It is yet a further object of the present invention to utilize an algorithm or equivalent means for dynamically tuning and adjusting the gain of a sigma-delta modulator in order to implement and optimize radio gain control at multiple tunable frequencies.

It is yet another object of the present invention to utilize an algorithm or equivalent means for dynamically tuning and adjusting the transfer function of a sigma-delta modulator in order to optimize transfer function stability of the modulator at multiple tunable frequencies.

It is still a further object of the present invention to utilize an algorithm or equivalent means for dynamically tuning the transfer functions of a sigma-delta modulator and a digital filter in order to optimize the cascade response of the modulator and the digital filter at multiple tunable frequencies.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
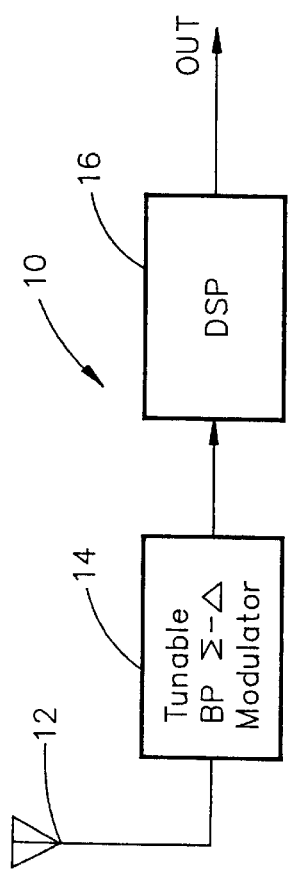
FIG. 1 is a block diagram of a digital receiver in accordance with the present invention.

Referring now to FIG. 1, a block diagram of a digital receiver in accordance with the present invention is shown. The receiver 10 receives an analog input signal with antenna 12 which feeds into the input of a tunable bandpass sigma-delta modulator ("Tunable BPσ–δModulator") 14. The output of the tunable bandpass sigma-delta modulator 14 feeds in turn into a digital signal processor for performing discrete-time signal processing.

Figure 2:
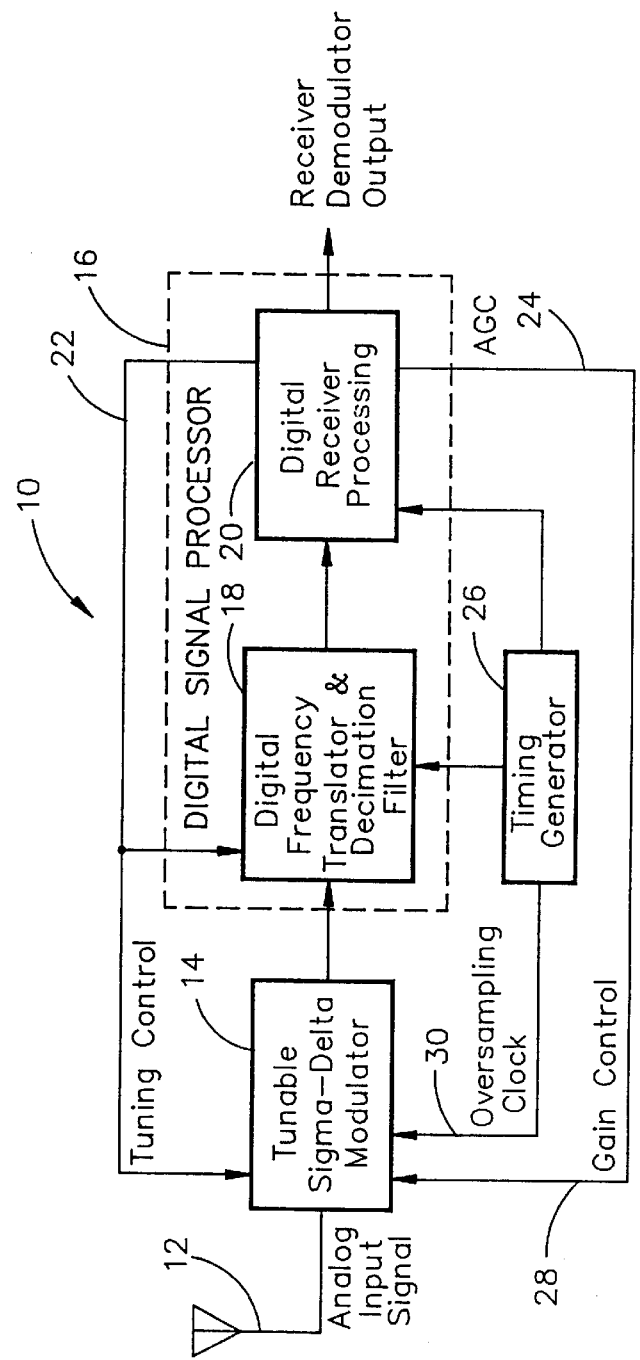
FIG. 2 is a detailed block diagram of the digital receiver design of FIG. 1.

Referring now to FIG. 2, a detailed block diagram of the digital receiver design of FIG. 1 is illustrated. An analog receiver input signal ("Analog Input Signal") is applied to a tunable bandpass sigma-delta modulator ADC ("Tunable Sigma-Delta Modulator") 14. Sigma-delta analog-to-digital conversion (AD conversion or ADC) is an oversampling A/D conversion process wherein signals are sampled at very high frequencies. It has very high resolution and low distortion and is typically utilized in digital audio recording devices. A sigma-delta analog-to-digital converter is typically referred to as a modulator because the signal is essentially pulse density modulated in that the density of the output pulses over a given time period is approximately equal to the mean value of the input signal over the same time period. In sigma-delta conversion, an analog signal is sampled at rates much higher than (typically 64 times) the Nyquist rate. The Nyquist rate may be considered the minimum sampling rate which does not result in significant aliasing of the sampled signal. The Nyquist sampling theorem dictates that a signal must be sampled at a rate greater than twice the bandwidth of the sampled signal to avoid aliasing.

This signal enters the modulator 14 where it is processed and sampled at a rate much greater than the Nyquist rate of the desired signal. The modulator 14 is tuned to the frequency of the desired signal and generates a very small word-length digital output signal at the high sample rate. The word-length of the digital output may be as low as 1-bit. One of the advantages of a 1-bit sigma-delta converter over a multibit linear converter is that a 1-bit quantizer can theoretically be perfectly linear, eliminating one of the ADC nonlinearities which limit dynamic range. In addition, the sigma-delta converter is more amenable to VLSI because only a small amount of analog circuitry is required. This digital signal is spectrally shaped by the modulator such that the tuned, desired signal is accurately represented at the high sample rate. Further, most of the digitizer quantizing noise of the modulator 14 is dominant only at out-of-band frequencies, away from the desired signal frequency.

The digital signal processor ("DIGITAL SIGNAL PROCESSOR") 16 comprises a digital frequency translator and decimation filter section ("Digital Frequency Translator & Decimation Filter") 18 and digital receiver processing block ("Digital Receiver Processing") 20. The translator and filter 18 receives the digitized desired signal from modulator 14, translates the desired signal frequency to a baseband frequency and filters out the out-of-band quantizing noise while preserving the desired in-band baseband signal. After the quantizing noise is removed, the sample rate is decimated (i.e. reduced) before being processed by digital receiver processing block 20.

At the tuned frequency, the digital signal processor 16 adjusts the transfer function of the bandpass sigma-delta modulator 14 via tuning control line ("Tuning Control") 22 to optimize its center frequency, noise shaping response, stability margin, and gain. The digital signal processor 16 also adjusts the transfer function of the digital translator and filter 18 to accommodate accurate frequency tuning and to optimize the cascade frequency response of the modulator 14 and the digital translator and decimation filter 18. Following decimation of the desired signal, the digital signal processor 16 performs the main radio selectivity filtering (IF filtering), signal demodulation, automatic gain control (AGC), audio filtering, etc., as in any digital receiver implementation. An automatic gain control line ("AGC") 24 is provided by the digital signal processor 16 to the modulator 14 to provide a gain control signal ("Gain Control") 28 to the modulator 14. A timing generator ("Timing Generator") 26 provides timing control signals to the translator and decimation filter 18 and to the digital receiver processor 20. The timing generator 26 further provides an oversampling clock ("Oversampling Clock") 30 to the sigma-delta modulator 14.

Figure 3:
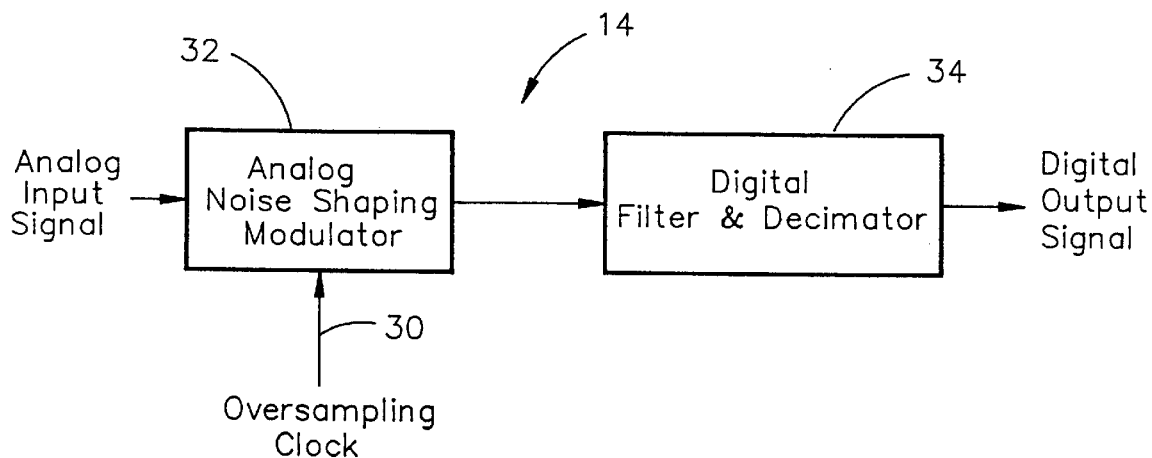
FIG. 3 is a block diagram of a sigma-delta modulation analog-to-digital converter in accordance with the present invention.

Referring now to FIG. 3, a block diagram of a sigma-delta modulation analog-to-digital converter in accordance with the present invention is shown. The sigma-delta modulator 14 essentially comprises two basic building blocks, an analog noise shaping modulator ("Analog Noise Shaping Modulator") 32 and a digital decimation filter ("Digital Filter & Decimator") 34 as shown. An analog input signal ("Analog Input Signal") enters the modulator 32 where it is sampled at a rate much greater than the Nyquist rate. It is called a modulator because the signal is essentially pulse density modulated. The density of the output pulses over a given time period is approximately equal to the mean value of the input signal over the same time period. The modulator 32 generates a 1-bit or greater output data stream which is spectrally shaped by the modulator 32 such that most of the quantizing noise power is at high frequencies out-of-band. The digital filter 34 removes most of the out-of-band quantizing noise prior to decimation so that it does not alias back in-band.

The sigma-delta modulator 14 must generally be quite a high order to keep the oversampling rate practical. High order stable modulators are difficult to design and maintain, especially if the converter must work with high signal frequencies or under adverse environmental conditions where component parasitic effects become significant (e.g., component value changes, nonlinear resistance and capacitance behavior, active device gain changes, electromagnetic stray coupling, etc.)

Figure 4:
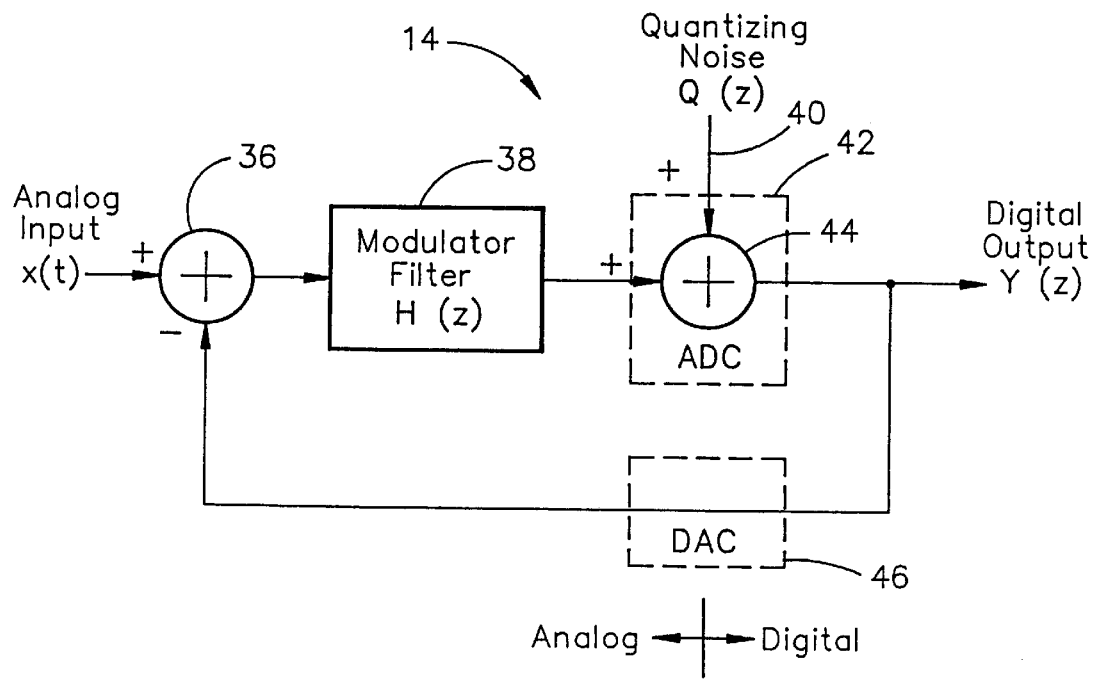
FIG. 4 is a block diagram of an interpolative sigma-delta modulator in accordance with the present invention.

Referring now to FIG. 4, a block diagram of an interpolative sigma-delta modulator in accordance with the present invention is shown. The analog input signal may be represented as x(t) ("Analog Input x(t)") which feeds into summing element 36. The output of the summing element 36 feeds into a modulator filter ("Modulator Filter H(z)") 38. H(z) is the discrete time z-transform of the modulator filter 38. The output of the modulator 38 is a digital, discrete-time signal represented as Y(z) ("Digital Output Y(z)"). To properly model and account for the quantizing error in the analog-to-digital conversion process, a quantizing noise signal ("Quantizing Noise Q(z)") 40 must be added to the output of the modulator filter 38 with summing element 44 wherein Q(z) is the quantizing error of the analog-to-digital converter ("ADC") 44. The output of the modulator 14 is feed back to summing element 36 where it is subtractively combined with the analog input signal x(t). Since the digital-to-analog converter ("DAC") 46 is assumed to perform an ideal signal conversion from the digital to analog domain, Y(z) is both the digital output of the modulator and analog output of the DAC 46.

In the sigma-delta modulator 14, the output of the DAC 46 oscillates about the input x(t). The difference between the output of the DAC 46 and x(t) is an error signal that passes through the modulator filter H(z) 38. The modulator "loop" then seeks to reduce the filter output error and thus reduce the tracking error. The z-domain output of the modulator shown in FIG. 4 is:

$$Y(z)=[X(z)H(z)]/[1+H(z)] +Q(z)/[1+H(z)]$$

If H(z) has a large magnitude response at a certain frequency then X(z) will be maximized and Q(z) will be minimized at the same frequency in the modulator output Y(z). When the sigma-delta modulator is desired to have a low-pass response, the transfer function H(z) of the modulator filter 38 is a low-pass filter response with a large magnitude response at zero hertz. When the sigma-delta modulator is desired to have a band-pass response, the transfer function H(z) of the modulator filter 38 is a band-pass filter response with a large magnitude response at band-pass center frequency.

This invention as illustrated in FIGS. 1–4 utilizes a tunable bandpass sigma-delta modulator 14 which is optimized or adjusted at multiple tuned frequencies, either automatically or by learned presets. By adjusting the modulator transfer function, a practical, high-order, tunable modulator 14, resistant to component tolerance and parasitic effects, eliminates the analog frequency synthesizer and translator in an RF/IF receiver design.

The modulator 14 is tunable by having the transfer function of the modulator 14 controlled by a digital signal processor 16. At each tuned frequency, the DSP 16 adjusts the transfer function of the bandpass sigma-delta modulator 14 to optimize its center frequency, noise shaping response, stability margin, and gain.

Figure 5:
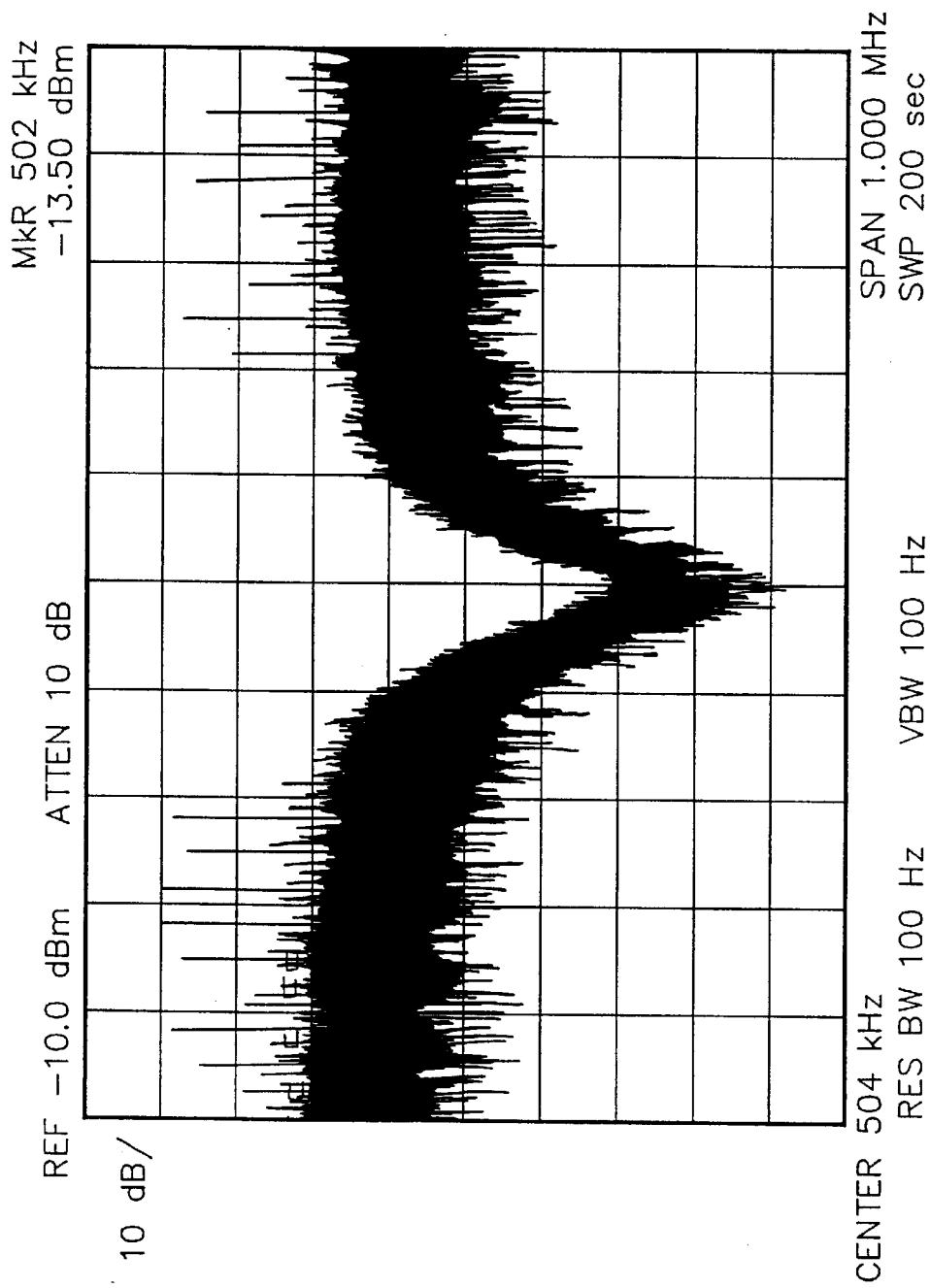
FIG. 5 is an illustration of a typical bandpass sigma-delta modulator output spectrum.

Referring now to FIG. 5, a typical bandpass sigma-delta modulator output spectrum is shown. As shown in FIG. 5, the quantizing noise is shaped and minimized at the tuned frequency of approximately 504 kHz in addition to the desired signal at 504 kHz.

The center frequency of the noise minimum shown in FIG. 5 is slightly lower than 504 kHz which represents an error in placing the center frequency of the modulator filter thereby illustrating a reason for dynamically tuning the modulator 14. Even at a fixed-tuned frequency, typical tolerances and temperature coefficients can result in large frequency errors (e.g., a 1% error at 30 MHz is 300 kHz). Worse yet, small errors in component values can result in radical transfer function errors in a high-order modulator design.

These problems are overcome by having the DSP 16 adjust the transfer function of the modulator filter 14 to adjust the noise spectrum "null" center to the correct frequency and optimize the noise spectral shaping. In implementation, this may be accomplished by learned presets or by periodically monitoring the noise spectrum of the modulator 14 and adjusting the transfer function for best performance in adapting the coefficients by using any number of adaptive filter algorithms.

It has been previously assumed that a high-order modulator may be difficult to unconditionally stabilize by design due to component gain and delay variations and signal dependent limit cycles. The present invention overcomes these problems by having the DSP 16 adjust the transfer function of the modulator filter 38 to accommodate variations in component parameters by learned presets or periodic monitoring of the modulator output spectrum. Signal dependent limit cycles or overload can be prevented by periodic monitoring. Typically, when the modulator overloads, the noise floor increases dramatically. Signal levels at the output of the modulator can be measured by the DSP, and the modulator gain reduced to prevent overload.

If the temperature compensation of the modulator is required, the DSP 16 can modify the tuning algorithm based on a local temperature sensor and learned thermal behavior. This approach can also be used to compensate any environmental effect that can be sensed.

The DSP 16 can also adjust the transfer function of the digital translator and filter 18 to accommodate accurate frequency tuning and to optimize the cascade frequency response of the modulator 14 and of the digital translator and decimation filter 18. By optimizing the cascade response thereof, minimal (optimal) digital filtering can be used to meet the performance specifications while preserving the processing capacity of the DSP 16 for other functions.

If the sigma-delta modulator 14 is a 1-bit device, the high performance frequency translation and filtering can be accomplished by simple digital integration of a complex window function. This complex window function can easily be computed and changed by the DSP 16 for each tuned frequency. Also, the effective oscillator word-length can be very large, allowing extremely high performance translation due to the very low phase noise due to quantization.

It is believed that the tunable bandpass sigma-delta digital receiver of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A digital radio-frequency receiver amenable to very large scale integration, comprising:

a tunable sigma-delta modulator for converting a received continuous-time analog signal into a discrete-time signal;

a temperature sensor; and a digital signal processor receiving the discrete-time digital signal and a signal from the temperature sensor, providing therefrom, adjustment of said tunable sigma-delta modulator to optimize the modulator transfer function at one or more tuned frequencies;

wherein said digital signal processor is capable of adjusting the transfer function of said tunable sigma-delta modulator to optimize at least one of center frequency noise shaping response stability margin and gain.

2. A digital radio-frequency receiver amenable to very large scale integration, comprising:

a tunable sigma-delta modulator for converting a received continuous-time analog signal into a discrete-time signal:

a temperature sensor: and a digital signal processor, said digital signal processor implementing a digital frequency translator and decimation filter and a digital receiver processor, said digital signal processor receiving the discrete-time digital signal and a signal from the temperature sensor, providing therefrom, adjustment of said tunable sigma-delta modulator to optimize the modulator transfer function at one or more tuned frequencies;

wherein said digital signal processor is capable of adjusting the transfer function of said tunable sigma-delta modulator to optimize at least one of center frequency, noise shaping response, stability margin, and gain.

3. A digital radio-frequency receiver amenable to very large scale integration, comprising:

a tunable sigma-delta modulator comprising an analog noise shaping modulator and a digital filter and decimator, said tunable sigma-delta modulator for converting a received continuous-time analog signal into a discrete-time signal;

a temperature sensor; and a digital signal processor receiving the discrete-time digital signal and a signal from the temperature sensor, providing therefrom, adjustment of said tunable sigma-delta modulator to optimize the modulator transfer function at one or more tuned frequencies;

wherein said digital signal processor is capable of adjusting the transfer function of said tunable sigma-delta modulator to optimize at least one of center frequency, noise shaping response, stability margin, and gain.

* * * * *